United States Patent [19]

Carr

[11] 4,228,934
[45] Oct. 21, 1980

[54] ICE BODY DELIVERY APPARATUS

[75] Inventor: Keith E. Carr, Lincoln Township, Berrien County, Mich.

[73] Assignee: Whirlpool Corporation, Belmont Harbor, Mich.

[21] Appl. No.: 972,805

[22] Filed: Dec. 26, 1978

[51] Int. Cl.³ ............................ G01F 11/20; B01F 7/24
[52] U.S. Cl. .................................... 222/412; 222/240; 366/196; 366/318
[58] Field of Search ............... 222/412, 235, 240, 228, 222/238; 221/254; 366/194, 195, 196

[56] References Cited

U.S. PATENT DOCUMENTS

| | | | |
|---|---|---|---|
| 222,478 | 12/1879 | Everett | 222/240 |
| 2,433,619 | 12/1947 | Monroe | 221/200 |
| 2,864,593 | 12/1958 | Shoup | 366/157 |
| 2,969,650 | 1/1961 | Eschenburg | 62/68 |
| 3,036,745 | 5/1962 | Johnson | 222/411 |
| 3,059,450 | 10/1962 | Mueller | 62/344 |
| 3,155,376 | 11/1964 | Möllenbruck | 366/194 X |
| 3,197,084 | 7/1965 | van der Levy et al. | 222/254 |
| 3,393,839 | 7/1968 | Weil et al. | 366/196 X |
| 3,517,860 | 6/1970 | Whalen | 222/202 |
| 3,780,993 | 12/1973 | Kline | 366/194 X |
| 3,845,886 | 11/1974 | Kokeisl | 222/241 |

FOREIGN PATENT DOCUMENTS 1063974 8/1959 Fed. Rep. of Germany .......... 222/236

Primary Examiner—Robert J. Spar
Assistant Examiner—Frederick R. Handren
Attorney, Agent, or Firm—Wegner, Stellman, McCord, Wiles & Wood

[57] ABSTRACT

An ice body delivery apparatus having a hopper for storing a plurality of discrete ice bodies and a wall portion defining an outlet opening for passing the ice bodies seriatim outwardly therethrough for dispensing the ice bodies as desired. A rotatable auger is provided in a lower frustoconical portion of the hopper and includes spaced spiral vanes arranged to sweep across the opening so as to dislodge ice bodies which may have become lodged thereacross. The auger is arranged so as to define an effectively open axial portion permitting the dislodged ice bodies to be returned to the outlet opening therethrough and under or behind the rotating vanes back to the outlet opening. The vanes extend arcuately a total of approximately 360 degrees or more. The auger may be driven by a subjacent drive motor.

12 Claims, 4 Drawing Figures

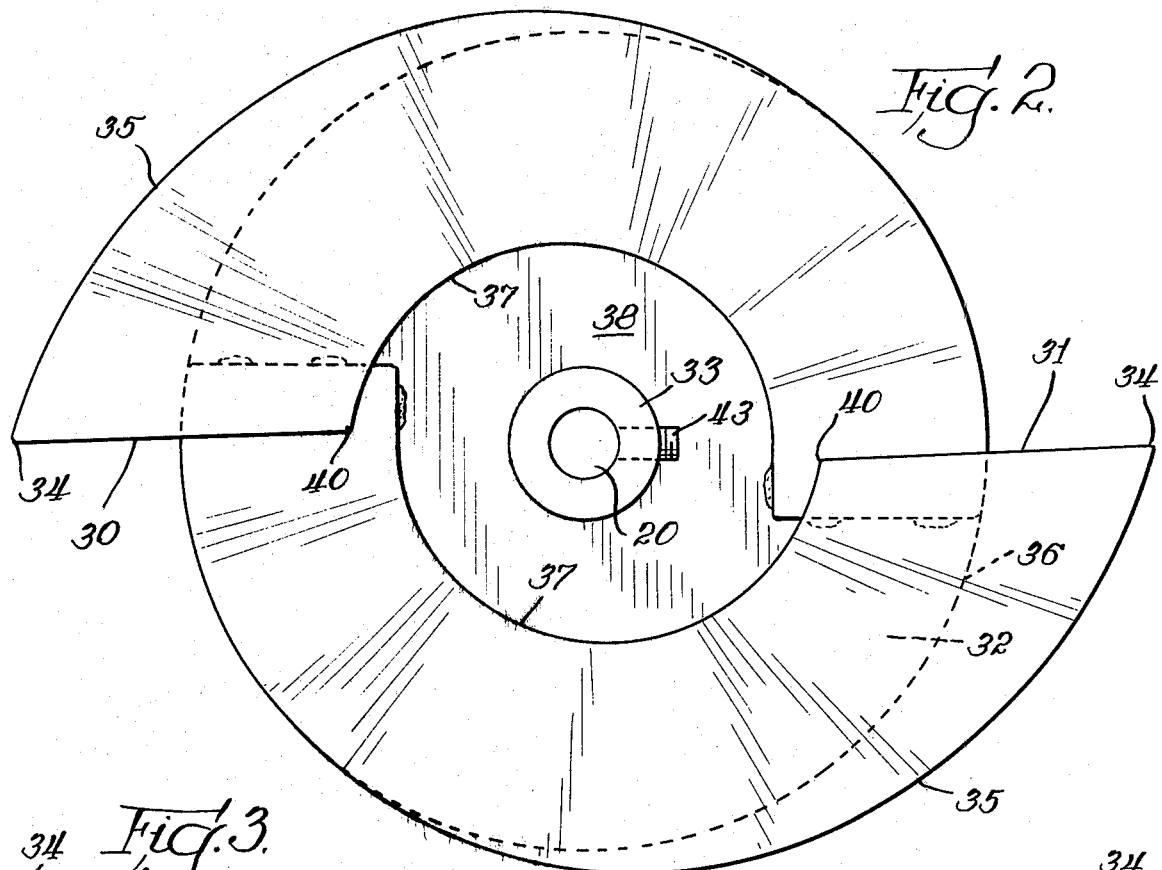
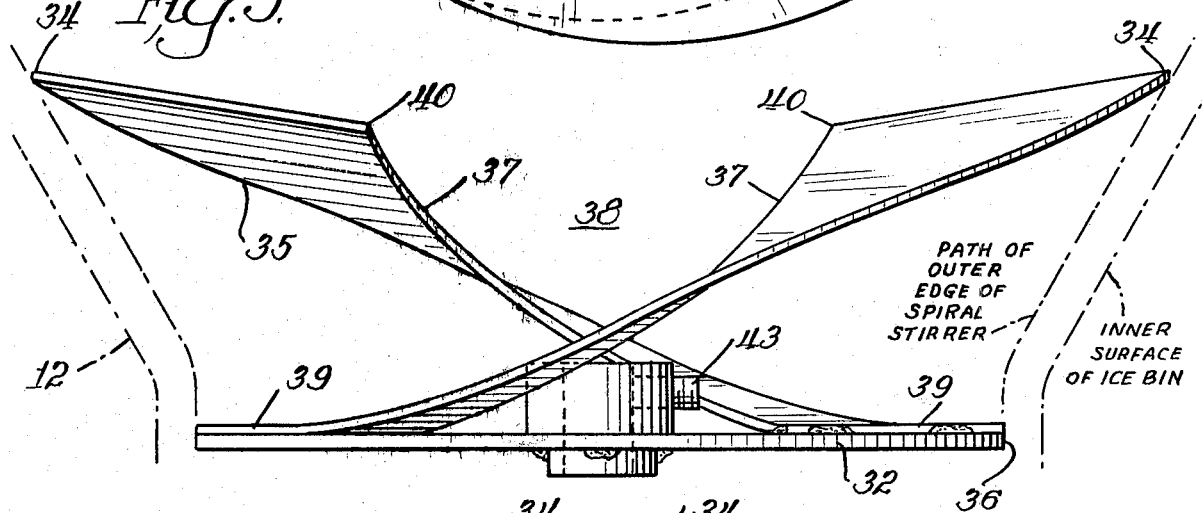
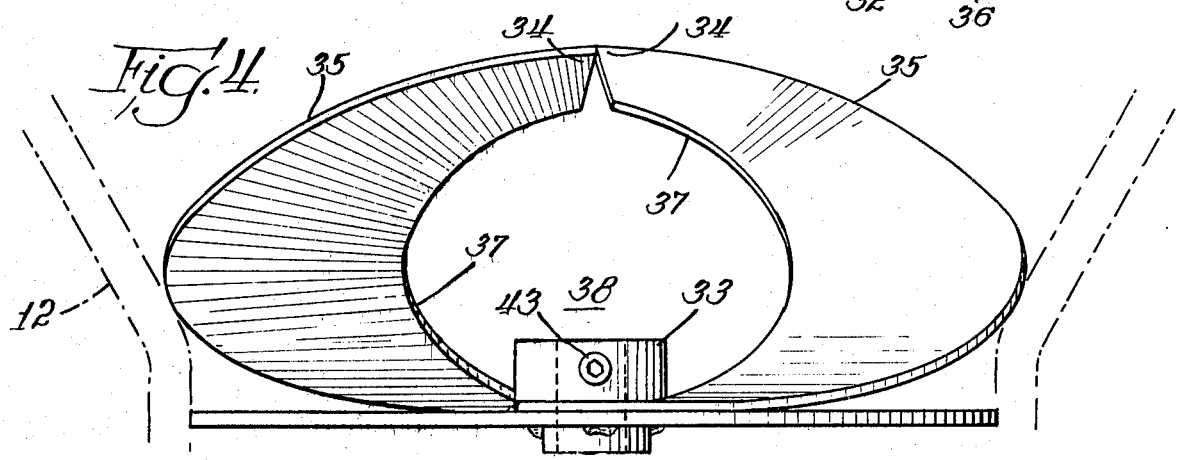

ICE BODY DELIVERY APPARATUS

BACKGROUND OF THE INVENTION

1. Field of the Invention

This invention relates to ice body delivery apparatus and in particular to means for preventing bridging of ice bodies at the dispensing outlet of the storage hopper of the apparatus.

2. Description of the Prior Art

In U.S. Pat. No. 2,433,619 of Charles Z. Monroe, a fruit-feeding mechanism is shown wherein fruits, such as oranges, are retained in a hopper having a frustoconical bottom with a central opening. An agitator includes blade portions extending outwardly away from the opening so as to agitate the fruit laterally of the opening. No portion of the agitator moves into overlying relationship to the opening during the operation of the agitator with the arms and inclined surfaces of the agitator breaking up any tendency of the fruit to jam laterally of the opening.

In U.S. Pat. No. 2,864,593, John M. Shoup shows a mixer for feed and the like having a continuous spiral element carried on an axial shaft and extending fully downwardly through a discharge spout at the lower end of the hopper.

W. A. Eschenburg et al, in U.S. Pat. No. 2,969,650, show an ice making and vending machine wherein an auger extends upwardly into a hopper in spaced relationship to a side opening of the hopper.

Walter E. Johnson, in U.S. Pat. No. 3,036,745, shows an apparatus for inducing the flow of pulverized material having a rotary vane wherein the outlet from the lower portion of the hopper is through the rotary shaft of the agitator vane.

In U.S. Pat. No. 3,059,450, Richard M. Mueller et al show a dispensing unit for dispensing flaked ice, cracked ice, and chipped ice. The unit includes a rotary vane structure wherein the vanes are spaced radially inwardly from the outlet opening.

Cornelis van der Lely et al show, in U.S. Pat. No. 3,197,084, a device for spreading granular or powdery material utilizing an agitator in a lower portion of a frustoconical hopper. The powdered material is delivered through outlet ports of an internal annulus to spreading arms of the device. An agitator is provided in the container above the spreading arm portion.

James M. Whalen shows an ice dispenser having polygonal walls in U.S. Pat. No. 3,517,860. The dispenser is arranged for delivering crushed, cracked and flaked ice and includes an impeller. An outlet opening 16 is provided in a sidewall of the hopper spaced outwardly of downturned end portions of the impeller arms.

Theodor Kokeisl shows, in U.S. Pat. No. 3,845,886, a device for metering flowable solids from a container having an orbiting scraper disposed within a cylindrical neck of the hopper. The scraper is provided with a screw formation for controlling the descent of the material to be dispensed. A scraper is mounted on the screw conveyor shaft. The scraper is shaped like a spatula and is curved backward. The leading edge of the scraper is sharpened and rests on the conical inside wall of the hopper with a preselected pressure. Thus, the scraper dislodges any material clinging to the sidewall of the hopper and causes it to move to the screw conveyor during the operation of the device.

SUMMARY OF THE INVENTION

The present invention comprehends an improved ice body delivery apparatus wherein novel means are provided for preventing blocking of the outlet opening provided for delivering the ice bodies from the hopper.

These means more specifically comprise freeing means for repetitively sweeping across the outlet opening within the hopper to dislodge therefrom any ice bodies which may have lodged in bridging relationship to the opening.

The sweeping means is arranged to return the dislodged ice bodies to the hopper for subsequent free movement thereof from the hopper outwardly through the opening in effecting the continuation of the dispensing operation.

The ice body freeing means is defined by a plurality of arcuate vanes which are so arranged within the hopper as to permit the freed ice bodies to circulate upwardly from the vanes and then downwardly through an open space at the axis of rotation of the vanes so as to pass rearwardly and under the vanes back to the outlet opening.

In the illustrated embodiment, the vanes overlap each other so as to extend at least 360 degrees, and more specifically, somewhat beyond 360 degrees cumulatively.

In the illustrated embodiment, the outlet opening is in a downwardly narrowing frustoconical bottom portion of the hopper and a delivery chute is provided underlying the opening so as to receive and temporarily store the quantity of delivered ice bodies. Means such as a solenoid operated valve may be associated with the lower end of the chute for selectively dispensing the ice bodies from the chute when desired.

The means for rotating the freeing means may comprise a drive mounted subjacent the bottom of the hopper with a shaft extending upwardly therefrom for driving the vanes about the axis of rotation.

The vanes may comprise segmentally spiral vanes with the outer edge thereof sweeping closely to the frustoconical wall and, thus, substantially directly across the outlet opening in the operation of the apparatus.

In the illustrated embodiment, the central open space of the freeing means is substantially cylindrical. The spiral vanes may have their lower ends supported on a disc for improved rigidity of construction.

BRIEF DESCRIPTION OF THE DRAWING

Other features and advantages of the invention will be apparent from the following description taken in connection with the accompanying drawing wherein:

FIG. 2 is a fragmentary plan view of the freeing means auger;

FIG. 3 is a side elevation of the auger; and

FIG. 4 is an end elevation looking from the right of FIG. 3.

DESCRIPTION OF THE PREFERRED EMBODIMENT

Figure 1:
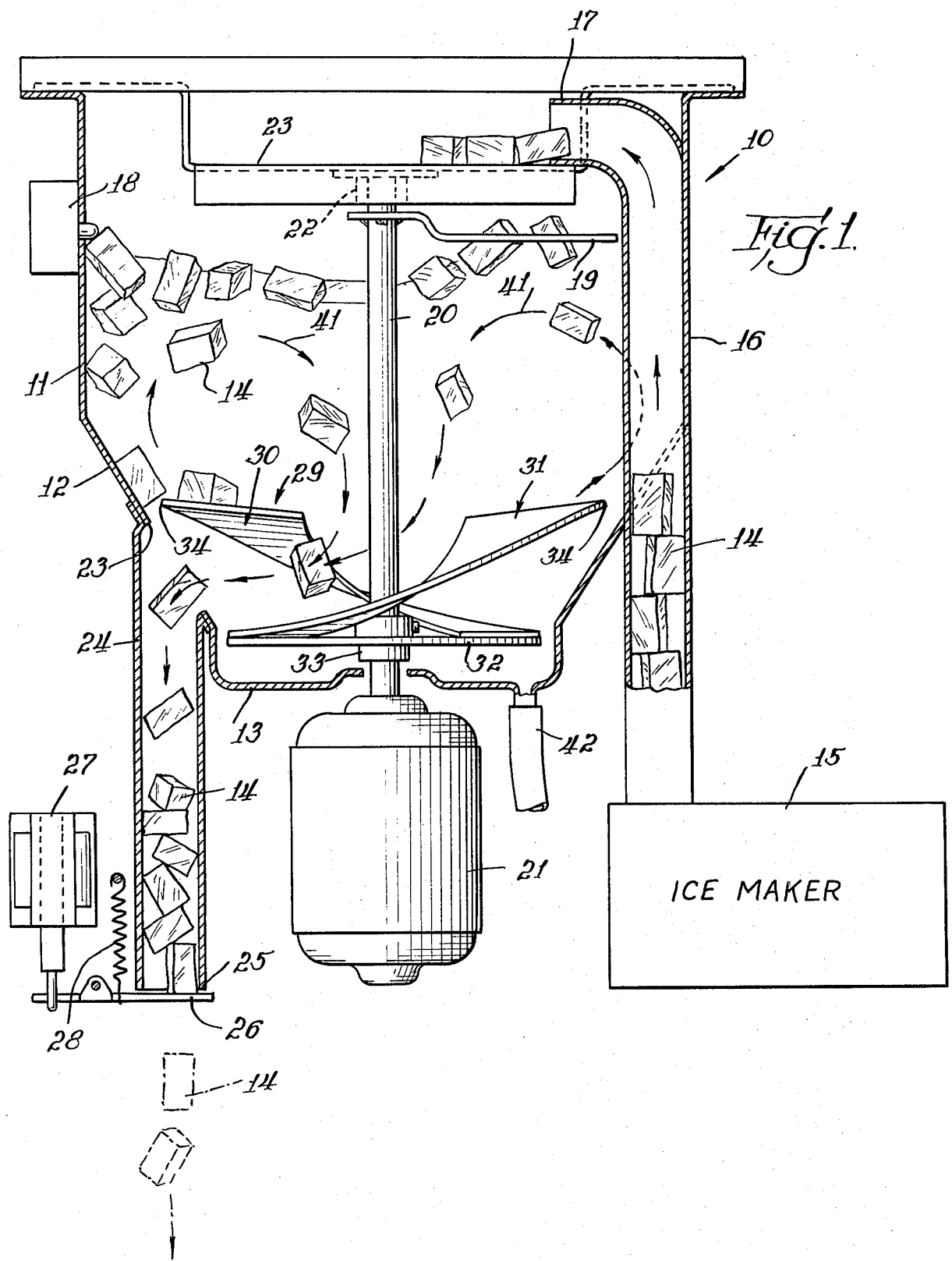
FIG. 1 is a fragmentary vertical section of an ice body delivery apparatus embodying the invention.

In the illustrative embodiment of the invention as disclosed in the drawing, an ice body delivery apparatus generally designated 10 is shown as including an ice bin, or hopper, 11 having a lower frustoconical downwardly narrowing bottom portion 12 terminating in a transverse bottom wall 13. Ice bodies 14 are delivered to the top of the hopper 11 from a conventional ice body maker 15. The ice bodies may be transferred to the body 11 through a delivery duct 16 having a delivery end 17 opening into the upper portion of the hopper. A conventional sensing device 18 may be provided for sensing the level of the ice bodies in the hopper so as to terminate operation of the ice maker 15 when the level reaches a preselected full level therein. To provide an improved sensing of the level, a leveler 19 may be provided on the upper end of a shaft 20 driven from a drive motor 21 mounted below the hopper bottom wall 13. The shaft may extend upwardly through the bottom wall and may be journaled at its upper end in a suitable bearing 22.

As shown in FIG. 1, the frustoconical bottom hopper portion 12 is provided with an outlet opening 23. A delivery duct 24 extends downwardly from the outlet opening 24 and the lower end 25 of the duct 24 is selectively closed by a valve 26. The valve is biased to the closed position by a spring 28 and selectively removed from closing relationship with the duct end 25 against the biasing action of spring 28 by a suitable solenoid operator 27. Thus, as shown in FIG. 1, a number of ice bodies 14 may be collected in the chute 24 when the lower end is closed by valve 26.

The present invention comprehends an improved means generally designated 29 for freeing, or dislodging, ice bodies which may have lodged in bridging relationship to the outlet opening 23, thereby assuring a proper free delivery of ice bodies in the operation of the delivery apparatus. More specifically, the freeing means 29 is defined by an auger having a plurality of segmentally spiral vanes 30 and 31 extending arcuately outwardly from a base disc 32 mounted to the shaft 20 by a suitable connecting collar 33. The tips 34 of the vanes 30 and 31 are disposed closely adjacent the frustoconical wall 12 with the arcuate outer edge 35 of the vanes spiraling inwardly to become generally congruent with the outer circular edge 36 of the supporting disc 32, as seen in FIG. 2. The inner edge 37 of the vanes similarly spirals somewhat radially inwardly to the lowermost portion of the vanes so as to cooperatively define, as seen in FIG. 2, a central, generally cylindrical, vertically extending space 38 about the shaft 20. As best seen in FIG. 3, the lowermost portion 39 of each of the vanes may be substantially flat and in facial engagement with the upper surface of the disc 32.

As further seen in FIG. 3, the vanes are further inclined radially inwardly so that the upper end 40 of each of the inner edges 37 is at a lower level than the tip 34 defining the upper end of the outer edge 35 of the respective vanes. Thus, upon rotation of the auger 29, ice bodies are urged by the upper surface thereof upwardly and radially inwardly in a circulation generally described by the arrows 41 in FIG. 1.

Thus, in operation, as shown in FIG. 1, the rotation of auger 29 about the vertical axis of the shaft 20 causes the vanes to sweep about the lower end of the hopper with the tips 34 thereof extending sufficiently close to the frustoconical wall 12 so as to dislodge from the outlet any ice bodies which may have lodged in bridging relationship to the opening. These dislodged ice bodies are then urged upwardly by the spiral configuration of the vanes and inwardly in a generally circular path, as indicated by the arrows 41 in FIG. 1, so as to then move downwardly through the central opening 38 defined by the inner edges of the spiral vanes so as to then move radially outwardly behind and under the vanes back to the outlet opening 23 for free delivery of the ice bodies downwardly through the outlet opening and chute 24 so as to be dispensed as desired under the control of the solenoid-operated valve 26. The delivery of the ice bodies from the delivery chute 24 is effectively gravity effected, as indicated.

In the illustrated embodiment, a melt delivery duct 42 is connected to the bottom wall 13 for delivering any melt to drain as desired. Further, as illustrated in FIG. 2, the collar 33 may be removably connected to the shaft 20 by suitable locking screw 43 permitting facilitated maintenance of the apparatus as desired.

In the illustrated embodiment, the freeing means auger 29 is shown as having two spiral vanes 30 and 31. As will be obvious to those skilled in the art, any number of such vanes may be utilized within the scope of the invention. Further, as will be obvious to those skilled in the art, suitable means may be provided for intermittently operating the freeing means 29 or selectively operating it as a function of operation of the dispensing valve.

The foregoing disclosure of specific embodiments is illustrative of the broad inventive concepts comprehended by the invention.

I claim:

1. In an ice body delivery apparatus having a hopper for storing a plurality of discrete ice bodies and having a wall portion defining an outlet opening having an upper edge portion and a lower edge portion for passing the ice bodies seriatim outwardly therethrough for dispensing the same, the improvement comprising:

helical wall means in said hopper defining a vertical helix axis, an upwardly facing lifting surface, an under surface, a lower end, an upper end, a radially outer edge and a radially inner edge; and driver means driving the lower end of the wall means for rotation of the wall means about said vertical axis with said outer edge sweeping said hopper wall portion and across said outlet opening as a result of said rotation, said inner edge defining an open cylindrical space about said vertical axis extending at least the full height between said upper and lower edge portions of the outlet opening, said driven lower end of the wall means being positioned at a level no higher than approximately that of said lower edge portion of the discharge opening and said upper end of the wall means being free and positioned at a level no lower than approximately that of said upper edge of the discharge opening, said cylindrical space having a lateral extent sufficient to freely pass ice bodies downwardly therethrough and being unobstructed at the periphery thereof to pass the ice bodies outwardly therefrom to under said helical wall means, whereby said wall means lifts from said discharge opening ice bodies which may have lodged therein, and causes the lifted ice bodies to move to the open cylindrical space, and pass downwardly through the cylindrical space and substantially horizontally radially outwardly under the helical wall means under surface freely to said discharge opening, said wall means preventing the weight of the ice bodies in the hopper above the wall means from acting on the ice bodies moving outwardly under said under surface.

2. The ice body delivery apparatus of claim 1 wherein said driving means comprises an electric gear motor having an output shaft extending into said hopper lower portion and coupled directly to said wall means.

3. The ice body delivery apparatus of claim 1 wherein said wall means comprises a plurality of agitator vanes arranged serially about an axis, said driver means rotating said plurality of vanes as a unit about said axis.

4. The ice body delivery apparatus of claim 1 wherein said wall comprises a plurality of spiral vanes arranged serially about an axis, the trailing upper end of each vane overlapping the leading lower end of the following vane.

5. The ice body delivery apparatus of claim 1 wherein said wall means comprises a plurality of segmentally spiral agitator vanes arranged serially about an axis, said driver means rotating said plurality of vanes as a unit about said axis.

6. The ice body delivery apparatus of claim 1 wherein said wall means comprises a plurality of segmentally spiral agitator vanes arranged serially about an axis, said driver means rotating said plurality of vanes as a unit about said axis, the series of said vanes extending cumulatively at least approximately 360 degrees about said axis.

7. The ice body delivery apparatus of claim 1 wherein said helical wall means lifting surface is inclined downwardly radially inwardly from said outer edge to said inner edge.

8. The ice body delivery apparatus of claim 1 wherein said lifting surface and under surface of the helical wall means are substantially parallel.

9. The ice body delivery apparatus of claim 1 wherein said driver means includes a rotatable disc effectively defining the bottom wall of the hopper and said lower end of the wall means is secured thereto.

10. In an ice body delivery apparatus having a hopper for storing a plurality of discrete ice bodies and having a frustoconical bottom wall portion provided with an outlet opening for passing the ice bodies seriatim outwardly therethrough for dispensing the same, the improvement comprising:

a pair of flat strip helical vanes each extending approximately 180° about a common vertical helix axis in said hopper, each vane defining an upwardly facing lifting surface, an under surface, a lower end, an upper end, a radially outer edge and a radially inner edge; and driver means driving the lower end of the vanes for rotation of the vanes about said vertical axis with said outer edges successively sweeping said hopper wall portion and across said outlet opening as a result of said rotation, said inner edges cooperatively defining an open cylindrical space about said vertical axis, said driven lower end of the vanes being positioned at a level no higher than approximately that of said lower edge portion of the discharge opening and said upper end of the vanes being free and positioned at a level no lower than approximately that of said upper edge of the discharge opening, said cylindrical space having a lateral extent sufficient to freely pass ice bodies downwardly therethrough, whereby said vanes lift from said discharge opening ice bodies which may have lodged therein, and cause the lifted ice bodies to move to the open cylindrical space, and pass downwardly through the cylindrical space and substantially horizontally radially outwardly under the helical vanes under surfaces freely to said discharge opening, said vanes preventing the weight of the ice bodies in the hopper above the vanes from acting on the ice bodies moving outwardly under said under surface.

11. The ice body delivery apparatus of claim 10 wherein said vanes extend in overlapping relationship at the ends thereof.

12. The ice body delivery apparatus of claim 1 or 10 further including passage means leading downwardly from said outlet opening, and means for retaining ice bodies selectively in said passage means for controlled release therefrom as desired.

* * * * *